United States Patent
Jayasuriya et al.

(10) Patent No.: US 9,174,600 B1
(45) Date of Patent: Nov. 3, 2015

(54) VEHICLE IMPACT ENERGY ABSORBER

(71) Applicant: Ford Global Technologies, LLC, Dearborn, MI (US)

(72) Inventors: Mangala A. Jayasuriya, Bloomfield Hills, MI (US); Robert William McCoy, Ann Arbor, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/527,094

(22) Filed: Oct. 29, 2014

(51) Int. Cl.
| | |
|---|---|
| *B60R 21/045* | (2006.01) |
| *B60R 21/206* | (2011.01) |
| *B60R 21/00* | (2006.01) |
| *B60R 21/04* | (2006.01) |
| *B60R 21/02* | (2006.01) |

(52) U.S. Cl.
CPC ............ *B60R 21/045* (2013.01); *B60R 21/206* (2013.01); *B60R 2021/0051* (2013.01); *B60R 2021/0273* (2013.01); *B60R 2021/0407* (2013.01)

(58) Field of Classification Search
CPC ............... B60R 21/045; B60R 21/206; B60R 2021/0407; B60R 2021/0051; B60R 2021/0273
See application file for complete search history.

(56) References Cited

U.S. PATENT DOCUMENTS

| | | | |
|---|---|---|---|
| 6,039,380 A * | 3/2000 | Heilig et al. ................. 296/70 |
| 6,193,272 B1 * | 2/2001 | Aigner et al. ............. 280/730.1 |
| 6,302,437 B1 * | 10/2001 | Marriott et al. .............. 280/732 |
| 6,416,079 B1 * | 7/2002 | Lutz et al. ................. 280/730.1 |
| 6,471,242 B2 * | 10/2002 | Schneider .................... 280/732 |
| 6,588,557 B2 | 7/2003 | Williams et al. |
| 6,601,870 B2 * | 8/2003 | Suzuki et al. ............. 280/728.3 |
| 6,874,811 B2 * | 4/2005 | Enders et al. ............. 280/730.1 |
| 7,246,677 B2 * | 7/2007 | Fredriksson et al. ......... 180/274 |
| 7,322,598 B2 * | 1/2008 | Galmiche et al. .......... 280/730.1 |
| 7,367,587 B2 * | 5/2008 | Taoka .......................... 280/751 |
| 7,654,557 B2 | 2/2010 | Enders |
| 8,231,138 B2 | 7/2012 | Sadr et al. |
| 8,491,008 B2 | 7/2013 | Roychoudhury et al. |
| 8,596,681 B1 * | 12/2013 | Strunk et al. .................. 280/752 |
| 2004/0007856 A1 * | 1/2004 | Enders et al. ............. 280/730.1 |
| 2004/0155447 A1 * | 8/2004 | Smith et al. ................... 280/753 |
| 2004/0256842 A1 | 12/2004 | Breed |
| 2005/0253369 A1 * | 11/2005 | Taoka .......................... 280/752 |

* cited by examiner

*Primary Examiner* — Drew Brown
(74) *Attorney, Agent, or Firm* — Frank A. MacKenzie; Bejin Bieneman PLC

(57) ABSTRACT

An impact absorbing device includes a plate and a panel having a panel thickness. An intermediate portion has a portion thickness and extends between the plate and the panel. The intermediate portion defines a chamber between the plate and the panel. A port is in communication with the chamber. The portion thickness is less than the panel thickness. The impact absorbing device is movable to a deployed position to contact an occupant during a collision. Since the portion thickness is less than the panel thickness, the intermediate portion expands more quickly, providing an impact surface for the occupant.

20 Claims, 9 Drawing Sheets

VEHICLE IMPACT ENERGY ABSORBER

BACKGROUND

An interior of a vehicle, such as automobile, typically includes energy absorbers for absorbing energy from an occupant of the vehicle during an impact of the vehicle. For example, the vehicle may include an instrument panel positioned in a front of the interior of the vehicle, and an energy absorber supported by the instrument panel. Specifically, the instrument panel may include a rigid frame and a knee bolster positioned between the knees of the occupant and the rigid frame. The knee bolster may be configured to absorb energy and soften impact between the knees of the occupant and the rigid frame of the instrument panel.

Energy absorbers may be passive, e.g., not activated before impact, or may be active, e.g., deployed when impact is sensed. Active energy absorbers are desired for some applications in the interior of the vehicle. However, space within the interior of the vehicle is limited and, as such, it is desirable to design the instrument panel to be as small as possible. There remains an opportunity to design an active energy absorber with a reduced footprint before deployment.

DETAILED DESCRIPTION

Figure 1:
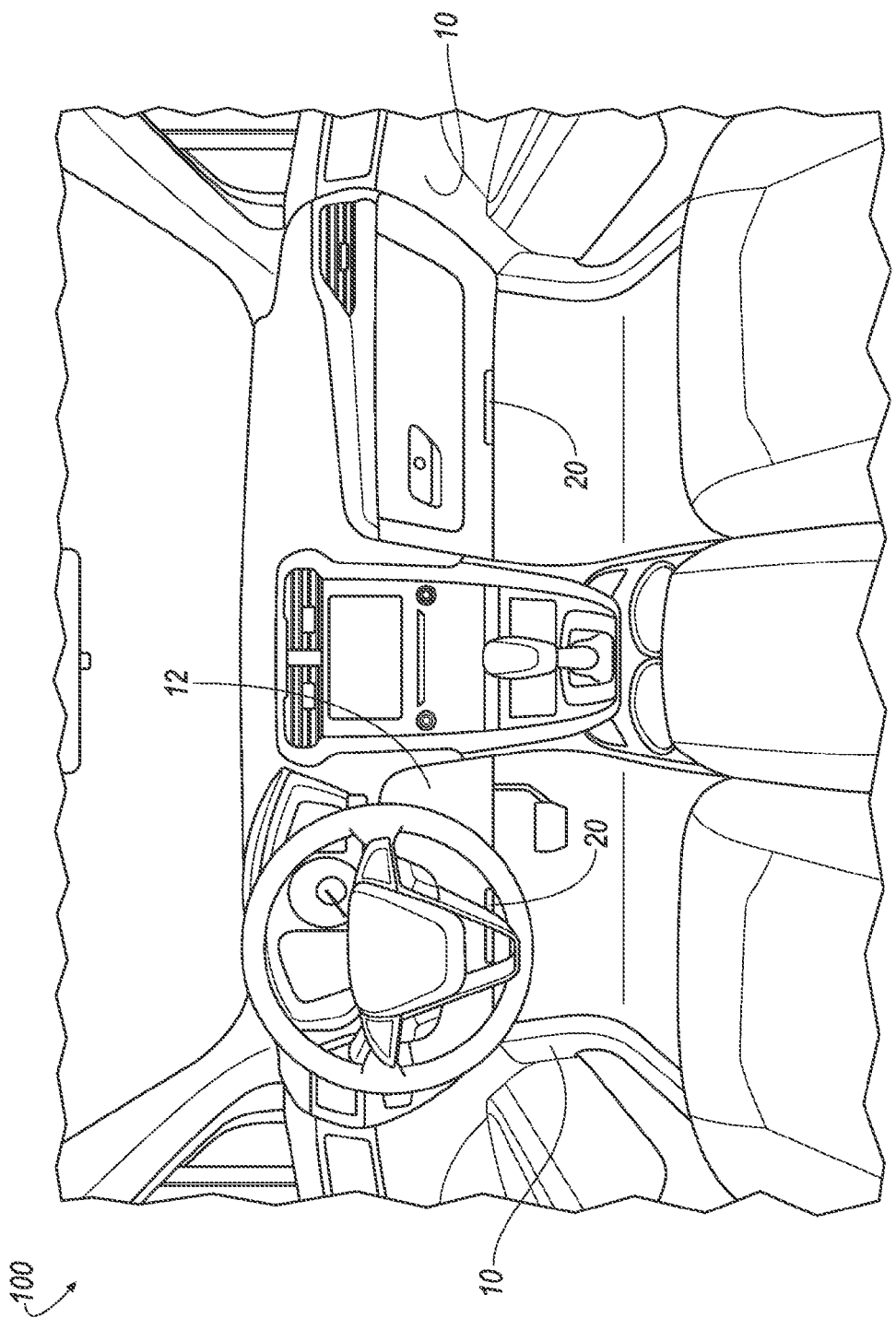
FIG. 1 is a front view of an interior of a vehicle with an impact absorbing device of an impact absorbing assembly in a stowed position.

With reference to the Figures, wherein like numerals indicate like parts throughout the several views, an impact absorbing device 20 includes a plate 22, a panel 24, and an intermediate portion 26. The intermediate portion 26 extends between the plate 22 and the panel 24 and defines a chamber 28 between the plate 22 and the panel 24. A port 30 is in communication with the chamber 28. The panel 24 has a panel thickness 24$t$ and the intermediate portion 26 has a portion thickness 26$t$ less than the panel thickness 24$t$.

The impact absorbing device 20 may be a component of an impact absorbing assembly 10. Specifically, the impact absorbing assembly 10 includes an instrument panel 12 and the impact absorbing device 20. The instrument panel 12 has a frame 16 and a cover 14, and the plate 22 of the impact absorbing device 20 is connected to the frame 16. The panel 24 of the impact absorbing device 20 is adjacent to the cover 14. An actuator 32 is configured to inflate the impact absorbing device 20.

The difference between the panel thickness 24$t$ and the portion thickness 26$t$ affects performance of the impact absorbing device 20. The intermediate portion 26 expands more quickly upon inflation by the actuator 32, as set forth further below, rapidly creating a larger surface area for impact with the occupant. The thicker panel thickness 24$t$ deploys into the vehicle first so that the intermediate portion 26 can expand outwardly creating a broader impact surface. Furthermore, the thinner portion thickness 26$t$ allows for more efficient packaging and less material used in manufacturing.

The impact absorbing assembly 10 is a component of a vehicle 100. The vehicle may be, for example, an automobile or any other suitable type of vehicle. The instrument panel 12 may be mounted to the rest of the vehicle 100 in any suitable manner.

Figure 2:
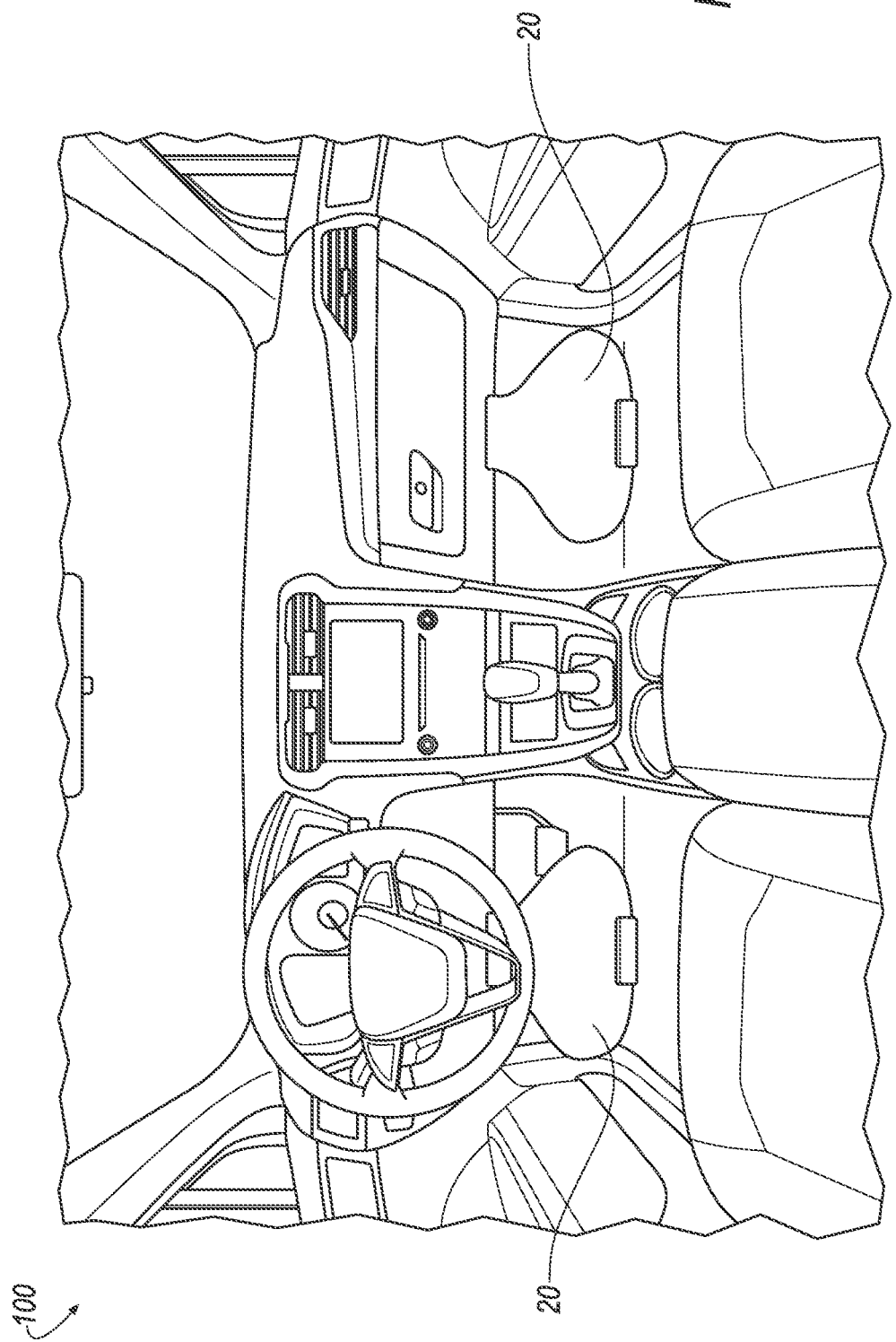
FIG. 2 is a front view of the interior of the vehicle with the impact absorbing device in a deployed position.

With reference to FIGS. 1 and 2, the impact absorbing device 20 is movable between a stowed position, as shown in FIG. 1, and a deployed position, as shown in FIG. 2, when a current or imminent impact is sensed between the vehicle and an object. The impact absorbing device 20 expands from the instrument panel 12 into a passenger compartment (not numbered) of the vehicle 100. As shown in FIGS. 1-2, the impact absorbing device 20 is positioned to absorb energy from legs of an occupant, i.e., the impact absorbing device 20 is a knee bolster. Alternatively, the impact absorbing device 20 may be positioned at any portion of the instrument panel 12 to deploy toward any part of the occupant, including the head, the torso, etc. of occupants sitting in any seat of the vehicle 100. The vehicle 100 may include any number of energy absorbing devices in any number of positions. The vehicle 100 shown in FIGS. 1 and 2, for example, includes two energy absorbing devices.

The plate 22 connects the impact absorbing device 20 to the instrument panel 12. The plate 22 may, for example, include at least one fastener 34. For example, the fastener 34 may be a threaded fastener connected to the frame of the instrument panel, as shown in FIGS. 3 and 4. The threaded fastener may extend through the frame 16 of the instrument panel 12 and may be retained to the frame 16 with threaded nuts. Alternatively, the plate 22 may be connected to the instrument panel 12 in any suitable manner.

Figure 5:
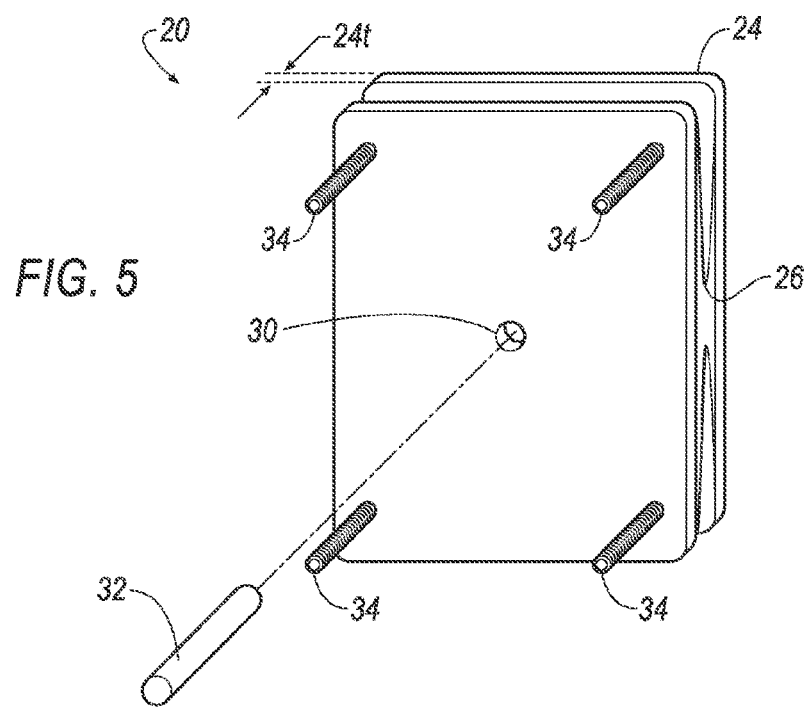
FIG. 5 is a rear view of the impact absorbing device in the stowed position with an actuator exploded from a plate of the impact absorbing device.
Figure 7:
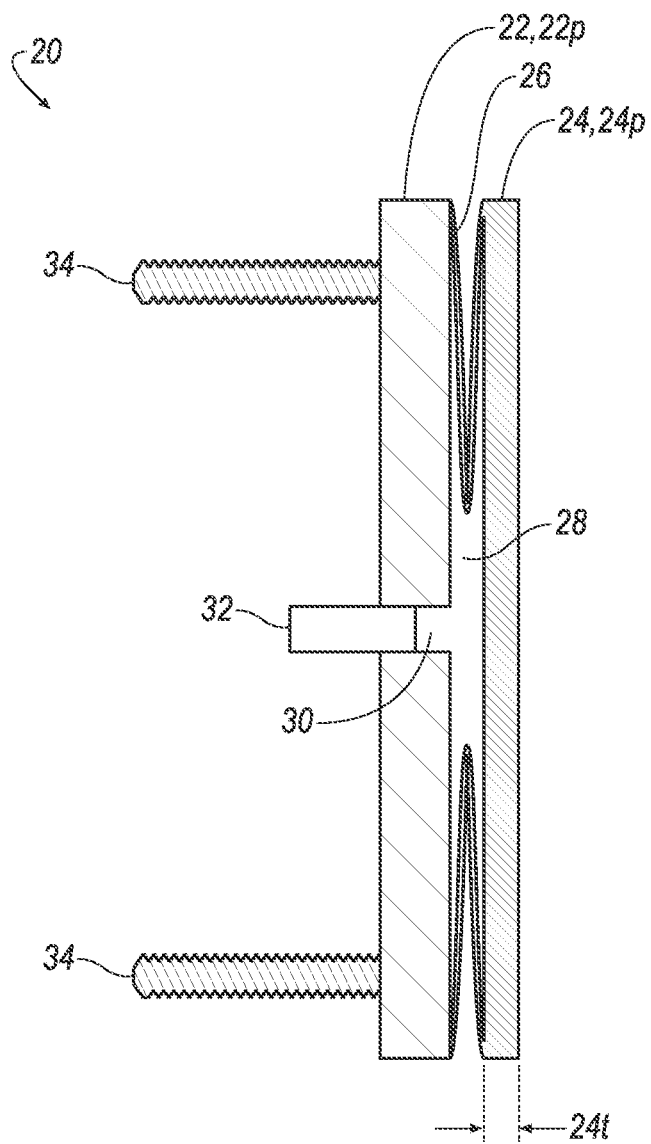
FIG. 7 is a cross-sectional view of the impact absorbing device in the stowed position.

The plate 22 may define the port 30 in communication with the actuator 32, as shown in FIGS. 5 and 7. The port 30 communicates actuation medium from the actuator 32 to the chamber 28 to move the impact absorbing device 20 from the stowed position to the deployed position, as set forth further below. Specifically, the actuator 32 may be open to the port 30, as best shown in FIG. 7. Alternatively, the actuator 32 may extend through the port 30 into the chamber 28 to deliver the actuation medium directly to the chamber 28.

The actuator 32 may be of any suitable type, such as a cold gas inflator. A cold gas inflator, which may be a smaller form of actuator, may save packaging space in the impact absorbing device 20. The actuation medium may be of any suitable type, such as a gas.

Figure 3A:
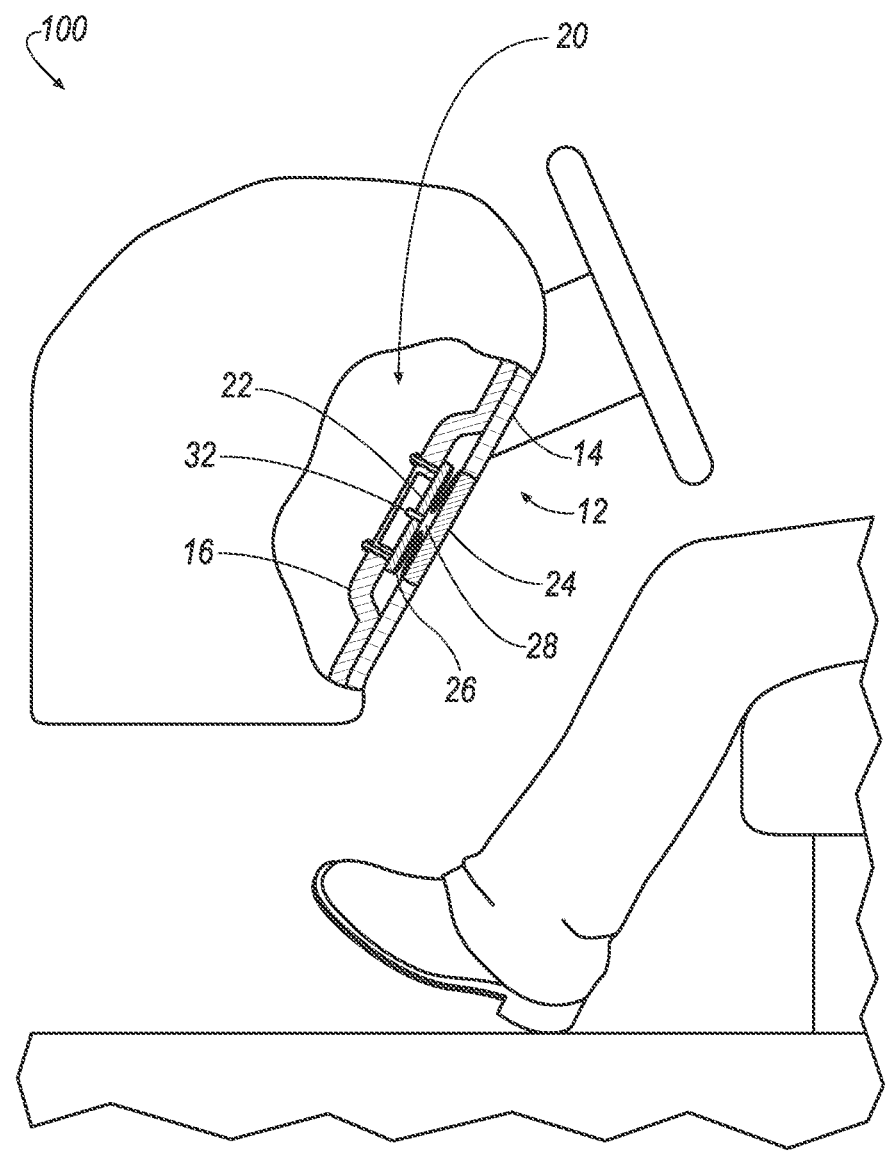
FIG. 3A is a side view of the interior of the vehicle with the impact absorbing device in the stowed position.

As best shown in FIGS. 1 and 3A, the panel 24 faces the occupant when the impact absorbing device 20 is in the stowed position. The panel 24 is projected into the vehicle 100 when the impact absorbing device 20 moves to the deployed position, as shown in FIGS. 2 and 4.

The impact absorbing device 20 may be flush with the instrument panel 12, e.g., aligned along the edges without indentation. Specifically, the panel 24 of the impact absorbing device 20 may be flush with the cover 14 of the instrument panel 12.

The panel 24 of the impact absorbing device 20 may present a class-A surface, i.e., a surface specifically manufactured to have a high quality, finished aesthetic appearance free of blemishes. The class-A surface may have any suitable surface texture, which may match surface texture of the instrument panel 12.

The intermediate portion 26 connects the plate 22 to the panel 24. The intermediate portion 26 expands upon deployment of the impact absorbing device 20 from the stowed position to the deployed position, as set forth further below. The intermediate portion 26 may be meshed; e.g., the intermediate portion 26 may include strands 40 woven into a design with polygonal openings, such as a cross-hatch. Another example of the meshed intermediate portion 26 may be a thin film with perforations (not shown). When meshed, the intermediate portion 26 is flexible, thin, easy to manufacture, and allows for customized inflation and venting. The meshed intermediate portion 26 may also reduce material usage and thus overall cost. The intermediate portion 26 may also be a flexible sheet or a thin solid film.

The panel 24 and the intermediate portion 26 may be integral, i.e., formed simultaneously as a unitary construction. A unitary construction allows for a more efficient manufacturing process and fewer stress concentration points. In alternative to being integral, the panel 24, and the intermediate portion 26 may be formed separately, and later joined by fusing, fastening, adhesives, or other joining methods. In addition, the plate 22 may be integral with the panel 24 and the intermediate portion 26, i.e., formed simultaneously as a unitary construction.

The panel 24 and the intermediate portion 26 may be formed of the same type of material, such as nylon, a rubber-plastic hybrid, or other suitable polymeric material. Forming the impact absorbing device 20 from the same type of material allows for easier manufacturing and reduced weight and cost. Using the same type of material also aids in joining the parts of the impact absorbing device 20 together during manufacturing.

When in the stowed position, for example, the panel thickness 24$t$ may be 1-3 mm and the portion thickness 26$t$ may be smaller than the panel thickness 24$t$. Since the intermediate portion 26 may have a greater surface area than the panel 24, decreasing the portion thickness 26$t$ can significantly save on packaging space. Furthermore, when the portion thickness 26$t$ is small, for example 1 mm or less, the intermediate portion 26 will inflate and expand much more rapidly than the panel 24, creating a large surface to absorb impact energy. The thin portion thickness 26$t$ also reduces visible fold lines and stress concentrations, increasing the durability of the impact absorbing device 20.

For proper inflation and packaging, the panel 24 may be spaced from the plate 22 in the stowed position, as shown in FIG. 7. Spacing the panel 24 from the plate 22 allows the intermediate portion 26 to be folded between the panel 24 and the plate 22, as in FIG. 7, decreasing the total amount of space needed for the impact absorbing device 20. The spacing also allows the panel 24 to expand during deployment, unlike the plate 22 which remains stationary.

As set forth above, the intermediate portion 26 defines a chamber 28 between the plate 22 and the panel 24. The chamber 28 is inflated upon impact, expanding the intermediate portion 26 into the impact surface. The size of the chamber 28 can vary, as a design factor, depending on how the intermediate portion 26 connects the plate 22 and the panel 24. The designed size of the chamber 28, which may be varied, may affect the inflation speed during deployment.

The plate 22 has a plate periphery 22$p$ and the panel 24 has a panel periphery 24$p$. The intermediate portion 26 may connect the plate periphery 22$p$ to the panel periphery 24$p$, maximizing the size of the chamber 28. Connecting the plate periphery 22$p$ to the panel periphery 24$p$ also eases manufacturing while allowing more of the intermediate portion 26 to be folded between the panel 24 and the plate 22.

As set forth above, the impact absorbing assembly 10 may include the actuator 32 in communication with the chamber 28. Upon impact, the actuator 32 inflates the impact absorbing device 20 through the port 30. The actuator 32 may be positioned within the port 32 or may communicate with the chamber 28 through another part of the impact absorbing device 20. The actuator 32 may be supported on the plate 22 and/or may be supported by another component, e.g. the instrument panel 12.

The actuator 32 may be in communication with an impact sensor (not shown) and a controller (not shown). The impact sensor is configured to sense exterior impact of the vehicle with an object. The impact sensor may sense an impact or may sense an imminent impact. The impact sensor may be of any suitable type, e.g., using accelerometers, radar, lidar, and/or a vision system. The vision system may include one or more cameras, CCD image sensors, and/or CMOS image sensors, etc.

The controller may be a microprocessor-based controller. The impact sensor is in communication with the controller to communicate data to the controller. Based on the data communicated by the impact sensor, the controller instructs the actuator to activate.

The controller and the impact sensor may be connected to a communication bus, such as a controller area network (CAN) bus, of the vehicle 100. The controller may use the information from the communication bus to control the activation of the actuator 32. The actuator 32 may alternatively be connected to the controller or to the communication bus.

Figure 4A:
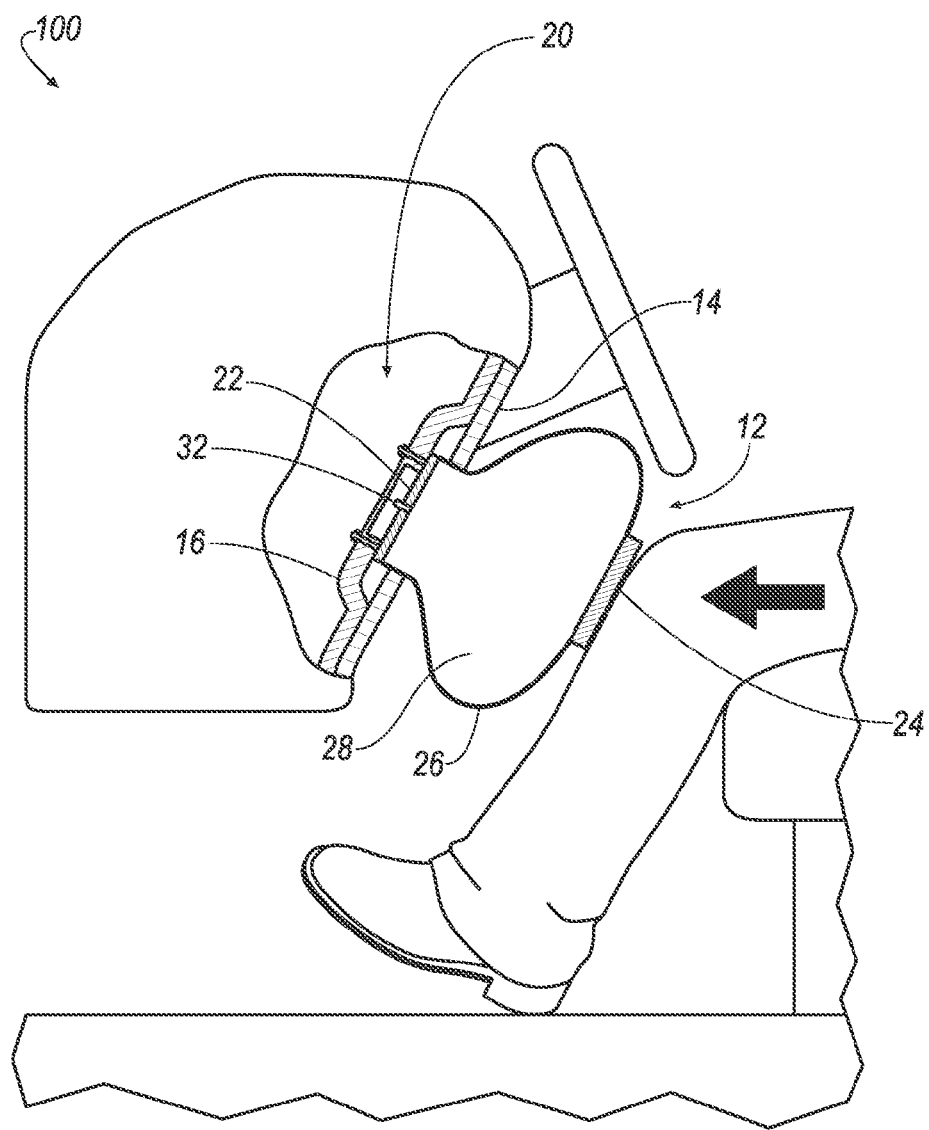
FIG. 4A is a side view of the interior of the vehicle with the impact absorbing device in the deployed position.

FIG. 3A shows a cross-sectional side view of the impact absorbing assembly 10 in the stowed position. FIG. 4A shows the impact absorbing assembly 10 in the deployed position. Upon inflation by the actuator 32, the panel 24 and the intermediate portion 26 expand into the vehicle, providing an impact surface. Since the portion thickness 26$t$ is less than the panel thickness 24$t$, the intermediate portion 26 expands into a larger impact surface than the panel 24. Specifically, the actuator 32 inflates the chamber 28 with actuation medium to stretch at least the intermediate portion 26 and expand the chamber 28.

Figure 3B:
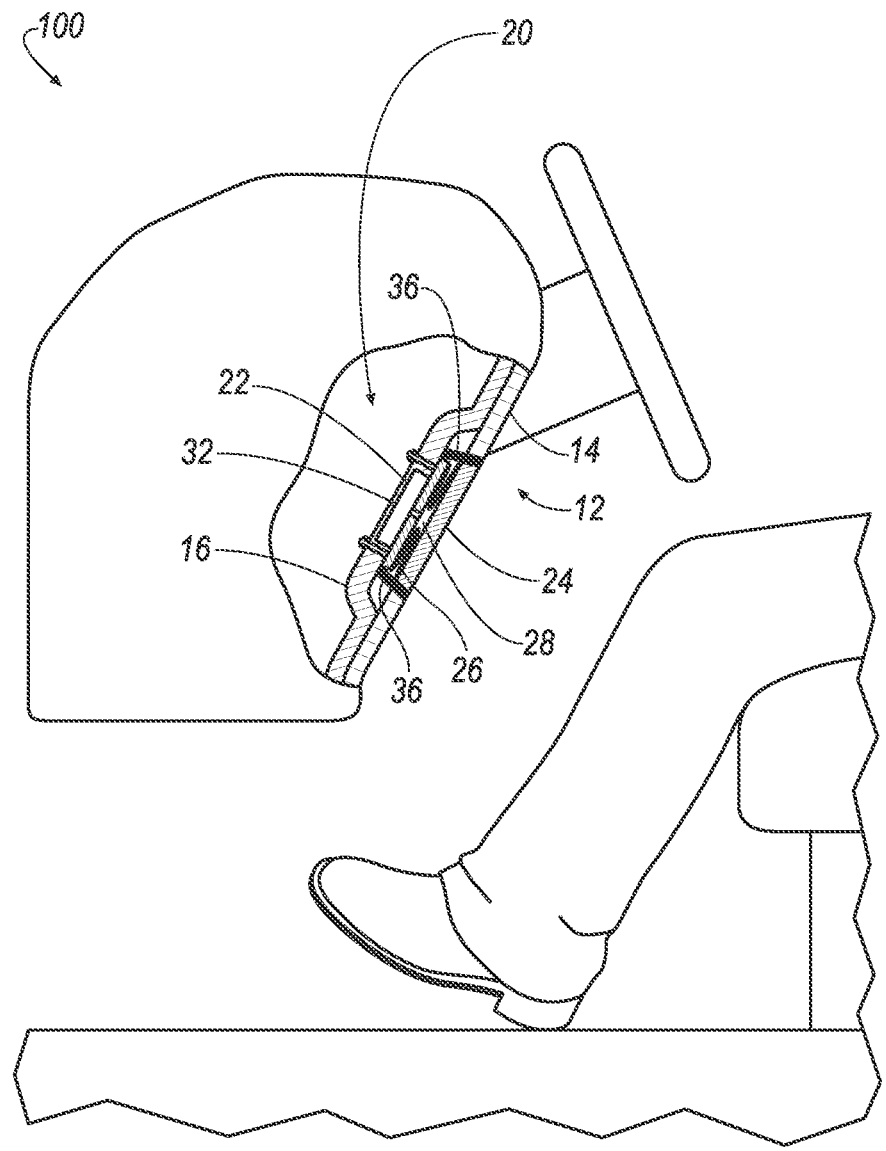
FIG. 3B is a side view of the interior of the vehicle with the impact absorbing device in the stowed position with chutes to facilitate deployment.
Figure 4B:
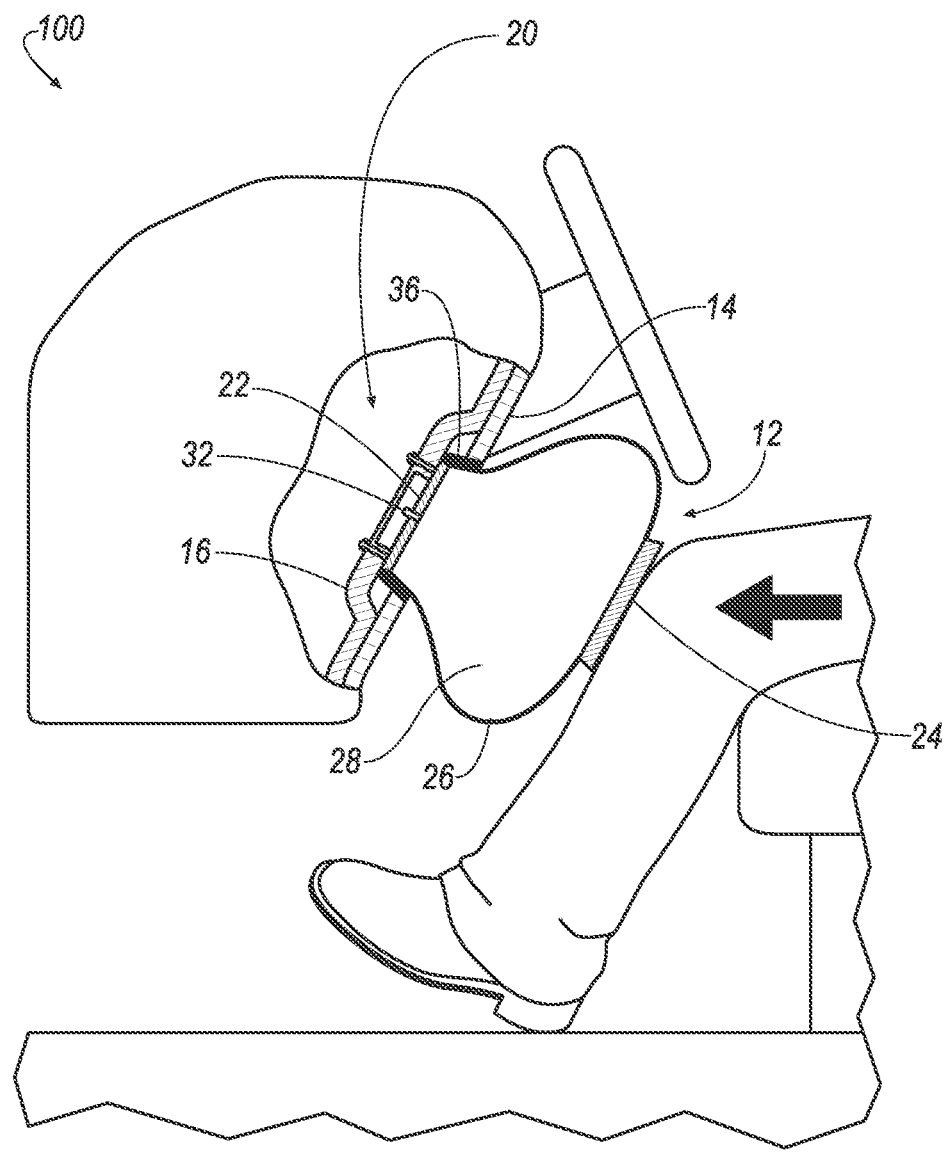
FIG. 4B is a side view of the interior of the vehicle with the impact absorbing device in the deployed position with chutes to facilitate deployment.

To facilitate smooth deployment of the intermediate portion 26, there may be a chute 36 as shown in FIGS. 3B and 4B. The chute 36 may extend from the frame 16 to the cover 14, extending around the panel periphery 24$p$. The chute 36 may be constructed of any suitable material, such as plastic. The chute 36 allows the intermediate portion 26 to expand more quickly, reducing the amount of time until the impact surface is created. The chute 36 may be a unitary construction or segmented to interact with different parts of the intermediate portion 26.

Figure 6:
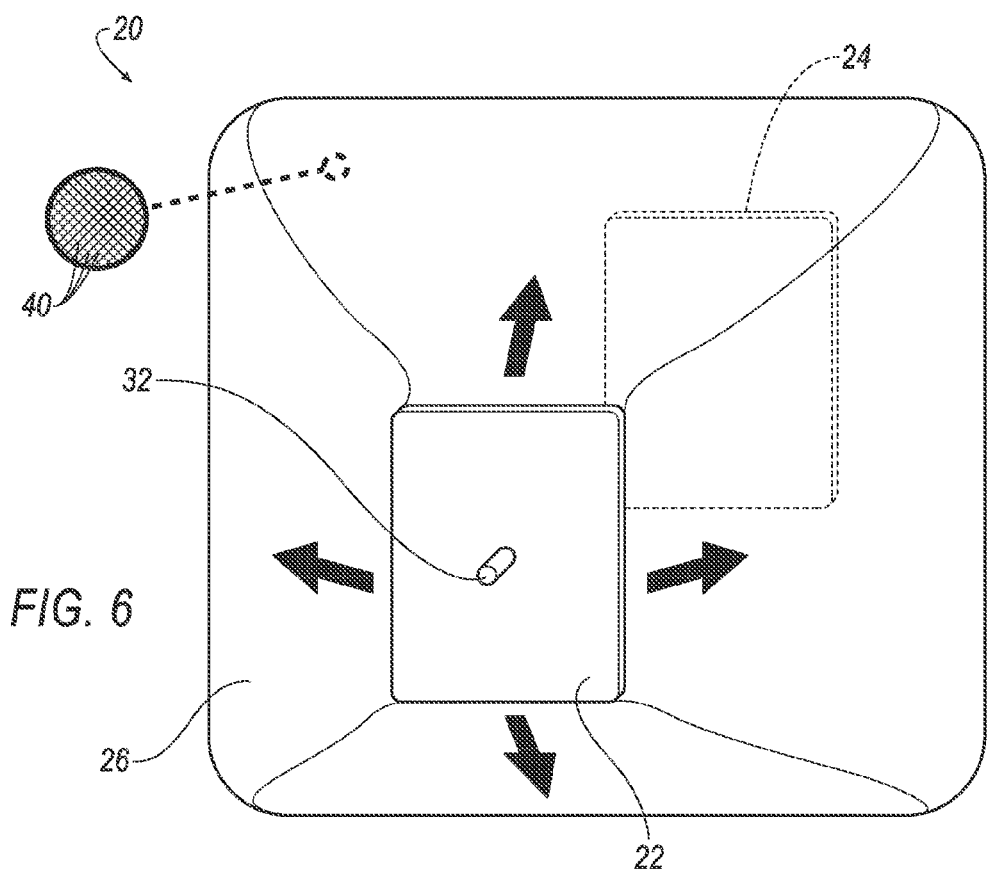
FIG. 6 is a rear view of the impact absorbing device in the deployed position and showing a portion of an intermediate portion of the impact absorbing device shown in a magnified view.

A rear view of the impact absorbing device 20 is shown in FIGS. 5 and 6. In FIG. 5, the impact absorbing device 20 is in the stowed position. The panel 24 is close to the plate 22, connected by the intermediate portion 26. The port 30 extends through the plate 22, and the actuator 32 is placed in the port 30, here shown in an exploded view. FIG. 6 shows the impact absorbing device 20 in the deployed position. The panel 24 and the intermediate portion 26 expand into an impact surface. The actuator 32 is shown in the port 30 defined by the plate 22.

The impact absorbing device 20 starts in the stowed position as shown in FIG. 5. During normal vehicle operation, the impact absorbing device 20 will remain in the stowed position. When impact between the vehicle and an object is sensed, the actuator 32 inflates the impact absorbing device 20, moving into the deployed position, shown in FIG. 6. An impact surface is rapidly produced as the panel 24 and the intermediate portion 26 expand toward the occupant. The impact absorbing device 20, e.g., at least the intermediate portion 26, expands in multiple directions from the stowed position to the deployed position.

The intermediate portion 26, now expanded, has few or no visible fold lines when in the deployed position. This prevents stress concentrations in the intermediate portion 26 and prolongs the life of the impact absorbing device 20. The use of a single type of material for the panel 24, the plate 22, and the intermediate portion 26 also reduces stress concentrations and fold lines. If the intermediate portion 26 is meshed, the expansion of the intermediate portion 26 can be further controlled.

Figure 8A:
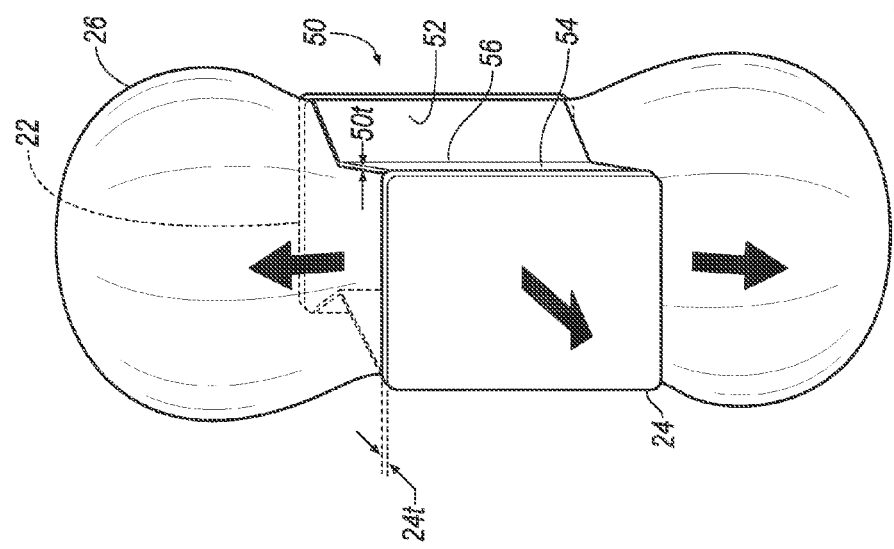
FIG. 8A is a front view of one configuration of a second embodiment of the impact absorbing device in the deployed position where the side panels point out.
Figure 8B:
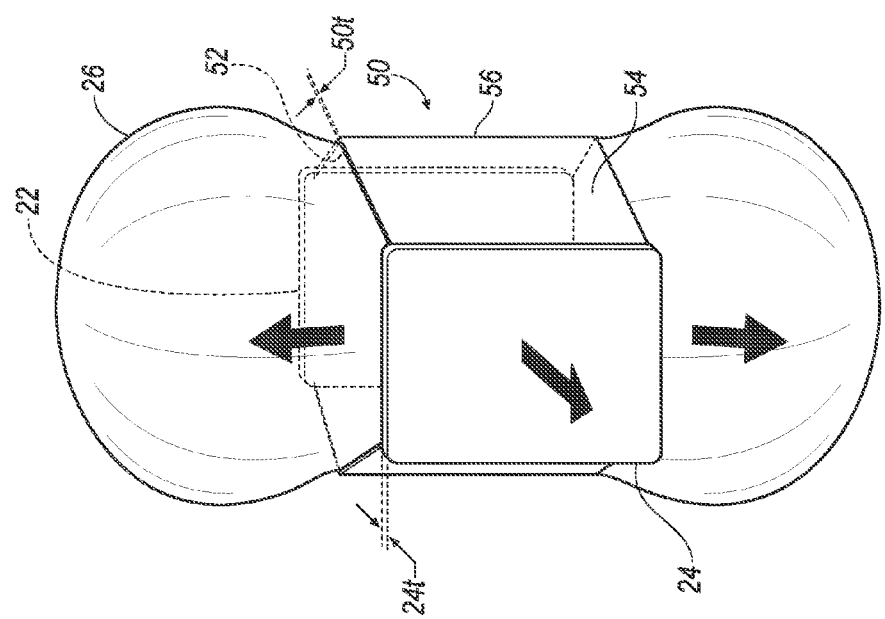
FIG. 8B is a front view of another configuration of the second embodiment of the impact absorbing device in the deployed position where the side panels point inward.

In a second embodiment shown in FIGS. 8A and 8B, the impact absorbing device 20 has at least one side panel 50 connected to the intermediate portion 26, the plate 22, and the panel 24, wherein the side panel 50 has a side panel thickness 50t greater than the portion thickness 26t. Unlike the intermediate portion 26, the side panel 50 does not expand outwardly from the panel 24, further allowing for controlled expansion of the impact absorbing device 20.

The side panel 50 may include a first portion 52 connected to the plate 22, a second portion 54 connected to the panel 24, and a crease 56 between the first portion 52 and the second portion 54. The side panel 50 may be folded between the plate 22 and the panel 24 as shown in FIG. 8. When the impact absorbing device 20 is in the deployed position, the crease 56 may expand to point outwardly away from the impact absorbing device 20, as in FIG. 8A, or may remain between the plate 22 and the panel 24, as in FIG. 8B. The impact absorbing device 20 may include any suitable number of side panels facing any suitable direction depending on the desired inflation characteristics of the impact absorbing device 20. The side panel 50 may have multiple creases 56.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An impact absorbing assembly comprising:
   an instrument panel having a frame and a cover;
   an impact absorbing device having a plate connected to the frame, a panel adjacent to the cover, and an intermediate portion connecting the plate and the panel; and
   an actuator configured to inflate the impact absorbing device;
   wherein the panel has a panel thickness and the intermediate portion has a portion thickness less than the panel thickness; and
   wherein the panel and the intermediate portion are integral.

2. The impact absorbing assembly of claim 1, wherein the plate is integral with the intermediate portion.

3. The impact absorbing assembly of claim 1, wherein the panel of the impact absorbing device is flush with the cover of the instrument panel.

4. The impact absorbing assembly of claim 1, further comprising an impact sensor and a controller in communication with the impact sensor and the actuator.

5. The impact absorbing assembly of claim 1, wherein the panel thickness is 1-3 mm and the portion thickness is less than the panel thickness.

6. The impact absorbing device of claim 5, wherein the plate is integral with the intermediate portion.

7. An impact absorbing device comprising:
   a plate;
   a panel having a panel thickness;
   an intermediate portion having a portion thickness and extending between the plate and the panel and defining a chamber between the plate and the panel; and
   a port in communication with the chamber;
   wherein the portion thickness is less than the panel thickness; and
   wherein the panel and the intermediate portion are integral.

8. The impact absorbing device of claim 7, wherein the panel and the intermediate portion are formed of the same type of material.

9. The impact absorbing device of claim 8, wherein the plate is formed of the same type of material as the panel and the intermediate portion.

10. The impact absorbing device of claim 7, wherein the intermediate portion is meshed.

11. The impact absorbing device of claim 7, wherein the panel is spaced from the plate.

12. The impact absorbing device of claim 7, wherein the port extends through the plate.

13. The impact absorbing device of claim 7, wherein the plate has a plate periphery and the panel has a panel periphery, and wherein the intermediate portion extends from the plate periphery to the panel periphery.

14. The impact absorbing device of claim 7, wherein the intermediate portion is folded between the panel and the plate.

15. The impact absorbing device of claim 7, further comprising an actuator in communication with the chamber through the port.

16. The impact absorbing device of claim 7, wherein the panel thickness is 1-3 mm and the portion thickness is less than the panel thickness.

17. The impact absorbing device of claim 7, further comprising a chute configured to smoothly deploy the intermediate portion.

18. The impact absorbing device of claim 7, further comprising at least one side panel connected to the intermediate portion, the plate, and the panel, wherein the at least one side panel has a side panel thickness greater than the portion thickness.

19. The impact absorbing device of claim 18, wherein the at least one side panel includes a first portion connected to the plate, a second portion connected to the panel, and at least one crease between the first portion and the second portion.

20. The impact absorbing device of claim 19, wherein the at least one side panel is folded between the panel and the plate.

* * * * *